(12) United States Patent
Carroni et al.

(10) Patent No.: US 7,976,304 B2
(45) Date of Patent: Jul. 12, 2011

(54) METHOD AND DEVICE FOR MIXING FLUID FLOWS

(75) Inventors: Richard Carroni, Niederrohrdorf (CH); Timothy Griffin, Ennetbaden (CH)

(73) Assignee: Alstom Technology Ltd, Baden (CH)

( * ) Notice: Subject to any disclaimer, the term of this patent is extended or adjusted under 35 U.S.C. 154(b) by 1625 days.

(21) Appl. No.: 11/066,925

(22) Filed: Feb. 28, 2005

(65) Prior Publication Data

US 2006/0202059 A1    Sep. 14, 2006

Related U.S. Application Data

(63) Continuation of application No. PCT/CH03/00407, filed on Jun. 23, 2003.
(60) Provisional application No. 60/406,976, filed on Aug. 30, 2002.

(51) Int. Cl.
*F23M 3/00* (2006.01)
*F23Q 25/00* (2006.01)

(52) U.S. Cl. ................... 431/7; 431/9; 431/268
(58) Field of Classification Search ............... 431/7–9, 431/268
See application file for complete search history.

(56) References Cited

U.S. PATENT DOCUMENTS

| 4,072,007 | A | | 2/1978 | Sanday |
| 5,202,303 | A | * | 4/1993 | Retallick et al. .......... 502/439 |
| 5,320,428 | A | * | 6/1994 | Streiff ..................... 366/337 |
| 5,328,359 | A | | 7/1994 | Retallick et al. |
| 6,179,608 | B1 | * | 1/2001 | Kraemer et al. ................ 431/9 |
| 6,334,769 | B1 | | 1/2002 | Retallick et al. |
| 6,638,055 | B2 | * | 10/2003 | Carroni et al. ................. 431/9 |
| 6,663,379 | B2 | | 12/2003 | Carroni et al. |
| 2001/0038576 | A1 | * | 11/2001 | Fleischli et al. .............. 366/337 |
| 2002/0038576 | A1 | * | 4/2002 | Matsuo ...................... 74/502.6 |
| 2002/0155403 | A1 | * | 10/2002 | Griffin et al. .................. 431/7 |
| 2002/0182555 | A1 | * | 12/2002 | Carroni et al. ................ 431/147 |
| 2003/0058737 | A1 | * | 3/2003 | Berry et al. ................... 366/340 |

FOREIGN PATENT DOCUMENTS

| DE | 100 03 090 A1 | 7/2001 |
| EP | 0 434 539 A1 | 6/1991 |
| EP | 1 179 709 A2 | 2/2002 |

* cited by examiner

*Primary Examiner* — Steven B McAllister
*Assistant Examiner* — Nikhil Mashruwala
(74) *Attorney, Agent, or Firm* — Buchanan Ingersoll & Rooney PC

(57) ABSTRACT

The present invention relates to a method for mixing at least two separate fluid flows (2, 3), in particular for a burner of a power plant.

To improve the mixing, a plurality of swirl flows (7, 8), which are annular and concentric with respect to a longitudinal center line (6), are generated from the fluid flows (2, 3), in such a manner that radially adjacent swirl flows (7, 8) have opposite directions of rotation.

9 Claims, 4 Drawing Sheets

METHOD AND DEVICE FOR MIXING FLUID FLOWS

RELATED APPLICATIONS

This application claims priorities under 35 U.S.C. §119 to U.S. Provisional Application No. 60/406,976 filed Aug. 30, 2002, and as a Continuation Application Under 35 U.S.C. §120 to PCT Application No. PCT/CH03/00407 filed as an International Application on Jun. 23, 2003 designating the U.S., the entire contents of which are hereby incorporated by reference in their entireties.

FIELD OF THE INVENTION

The present invention relates to a method and a device for mixing at least two separate fluid flows, in particular for a burner of a power plant.

A range of applications require thorough mixing of separate gas flows. One such application is, for example, catalytic combustion for generating hot gas for operation of a gas turbine, in which a gaseous fuel, generally natural gas, and a gaseous oxidant, generally air, have to be intensively mixed before this fuel-oxidant mixture enters the respective catalyst. Conventional lean-mix premix burners also require the fuel-oxidant mixture supplied to be mixed as homogeneously as possible. Inadequate mixing may lead to a lack of uniformity in the combustion process, in which relatively extensive temperature differences may be determined, with increased levels of undesirable $NO_x$ forming in zones which are at particularly high temperatures.

U.S. Pat. No. 5,202,203 and U.S. Pat. No. 5,328,359 show catalysts which are constructed from corrugated or folded plate material. The folds or corrugations of the plate material form a multiplicity of channels through which medium can flow. As it flows through a catalyst of this type, some of a fuel-oxidant mixture is burnt. To prevent a catalyst of this type from overheating, the combustion has to be restricted to only part of the mixture flowing through the catalyst. For this purpose, only some of the channels are made catalytically active, for example by a suitable coating, whereas the other channels are catalytically inactive. As the medium flows through the catalyst, combustion takes place only within the catalytically active channels, whereas the flow through the catalytically inactive channels cools the catalyst. In the known catalysts, the corrugations or folds are, moreover, repeatedly inclined in zigzag fashion with respect to a main through flow direction. The layered arrangement is then such that the inclinations of adjacent layers are offset with respect to one another, in such a way that the folds or corrugations of one layer cannot penetrate into the folds or corrugations of the adjacent layer. The channels which are formed on one side of the respective plate material by the corrugations or folds of the latter are open toward those channels which are formed on the facing side of the adjacent plate material by the corrugations or folds of the latter. This means that the flow of fluid can constantly alternate between the channels which are open toward one another by passing between adjacent plate materials, with the result that the gas flow does not have a defined outflow direction at the outlet of the respective catalyst.

SUMMARY OF THE INVENTION

The invention seeks to remedy this problem. The invention as characterized in the claims deals with the problem of demonstrating an advantageous way of mixing at least two separate fluid flows.

According to the invention, this problem is solved by the subject matters of the independent claims. Advantageous embodiments form the subject matter of the dependent claims.

The present invention is based on the general idea of effecting mixing with the aid of a plurality of opposite swirl flows which are arranged helically or annularly and concentrically with respect to an axial longitudinal center line extending in the main direction of flow. The formation of the largest possible number of swirl flows which rotate in opposite directions and are arranged concentrically inside one another leads to the formation of a correspondingly large number of concentric and likewise annular shearing layers, which effect intimate fluid mixing. The quality of mixing which can be achieved depends on the number of shearing layers that are formed; the more shearing layers are formed, the better the mixing becomes.

In a particularly advantageous refinement, it is possible to provide for an annular, concentric and swirl-free axial flow to be generated at least between two radially adjacent swirl flows. This too gives rise to shearing layers which contribute to intimate mixing. At the same time, the axial flow effects axial orientation of the swirl flows during the mixing. Therefore, the mixing flow can be homogenized in terms of flow velocity and flow direction with the aid of this measure.

Further features and advantages of the present invention will emerge from the subclaims, from the drawings and from the associated description of figures with reference to the drawings.

BRIEF DESCRIPTION OF THE DRAWINGS

Preferred exemplary embodiments of the invention are illustrated in the drawings and explained in more detail in the description which follows, in which identical designations relate to identical or similar or functionally equivalent components. In the drawings, in each case diagrammatically.

WAYS OF CARRYING OUT THE INVENTION

Figure 1:
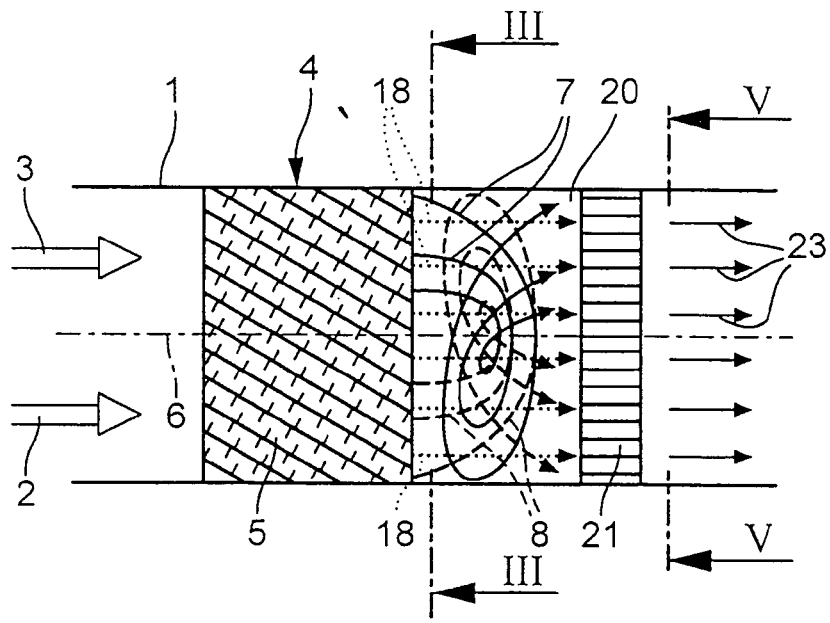
FIG. 1 shows a greatly simplified outline illustration of a longitudinal section through a flow channel in which a device according to the invention is arranged.

FIG. 1 shows a portion of a channel 1 into which at least two separate fluid flows 2 and 3 are introduced. It is preferable for the channel portion 1 to lead to a burner (not shown here) or to a combustor for heating a gas turbine of a power plant. The fluid flows are then preferably a fuel flow 2 and an oxidant flow 3, the fuel used preferably being natural gas and the oxidant used expediently being air.

To achieve intensive mixing of the two fluid flows 2, 3, a device 4 according to the invention is arranged in the channel portion 1. The device 4 comprises a swirl generating structure 5, which is designed in such a way that when medium flows through it a plurality of annular swirl flows 7, 8 which are arranged concentrically with respect to an axial longitudinal center line 6, are generated, in such a manner that radially adjacent swirl flows 7, 8 each have an opposite direction of rotation. Therefore, to illustrate this, in FIG. 1 the first swirl flows 7 are illustrated by solid lines, while the oppositely directed other swirl flows 8 are indicated by dashed lines.

Figure 2:
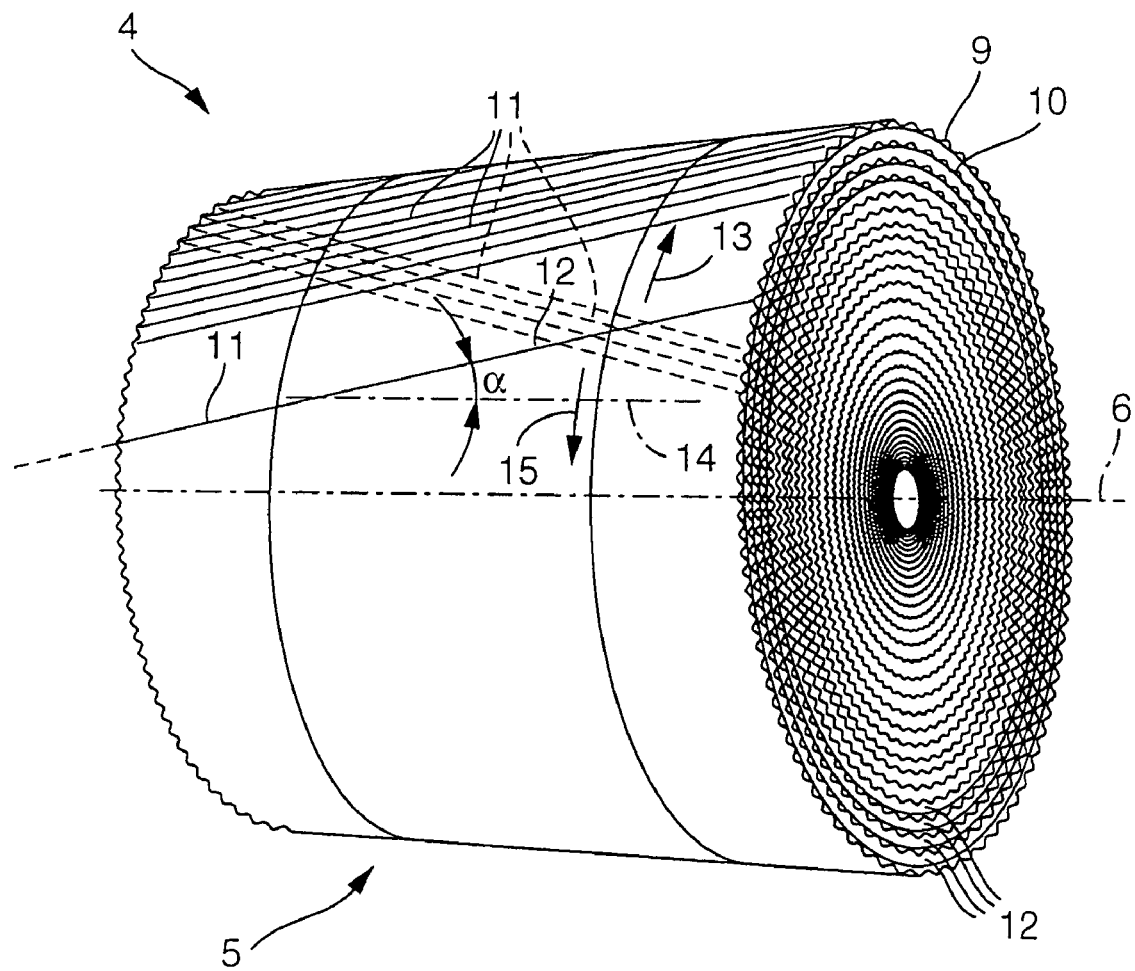
FIG. 2 shows a perspective view of the device in the form of a simplified illustration.

In accordance with FIG. 2, the swirl generating structure 5 of the device 4 is preferably produced by helically winding a plurality of plates 9, 10 made from corrugated or folded first plate material 9 and flat or smooth second plate material 10. Therefore, the first plate material 9 has corrugations or folds 11, which by virtue of the special layered arrangement form a multiplicity of channels 12 through which medium can flow through the swirl generating structure 5. On account of the design selected for the swirl generating structure 5, the channels 12 are arranged in concentric annuli or concentric coils with respect to the longitudinal center line 6.

The visible, outermost first plate material 9 is oriented with its folds or corrugations 11 such that the channels 12 which are thereby formed are inclined in a first direction 13, represented by an arrow, in the circumferential direction with respect to the longitudinal center line 6. This inclination results in an angle α between the respective channel 12 or the respective corrugation or fold 11 and an axis 14 which runs through the respective channel 12 and parallel to the longitudinal center line 6. The corrugations or folds 11 of the first plate material 9 which adjoins it on the radially inner side are oriented in the opposite direction, so that the channels 12 which are thereby formed are inclined in a second direction 15, which is represented by an arrow and extends in the opposite direction to the first direction 13, in the circumferential direction with respect to the longitudinal center line 6. Accordingly, there is an opposite angle −α, the magnitude of which is approximately equal to that of the angle in the adjacent plate material 9, between the folds or corrugations 11 indicated by dashed lines or the channels 12 which they form and the axis 14, which is correspondingly offset in the radially inward direction. The alternating orientation of the channels 12 then continues in the radial direction.

In this context, it may be expedient for the angles α and −α to decrease continuously in magnitude from the radially outer side and to deviate little if at all from a value of zero in the vicinity of the longitudinal center line 6.

Furthermore, in an advantageous development which is explained in more detail below, further first plate materials 9 may be present, these materials being oriented in such a way within the swirl generating structure 5 that their folds or corrugations 11 or the channels 12 which they form run parallel to the longitudinal center line 6, so that the angle α has a value of zero.

In the embodiment described here, the plate materials 9, 10 in the swirl generating structure 5 are arranged in such a way that individual annuli or coils are formed, and when medium flows through these annuli or coils in each case a left-hand swirl flow or a right-hand swirl flow or a swirl-free axial flow is generated. It will be clear that in another embodiment the material plates 9, 10 may also be arranged in such a way that in each case at least two annuli or coils, which generate identically directed flows in medium flowing through them, are combined to form a group, in which case groups which generate left-hand swirl flows or right-hand swirl flows or swirl-free axial flows then alternate in the radial direction. In the present context, the term coil is to be understood as meaning a winding arrangement around the winding axis 6 which extends through at least 360° in the circumferential direction.

Figure 3:
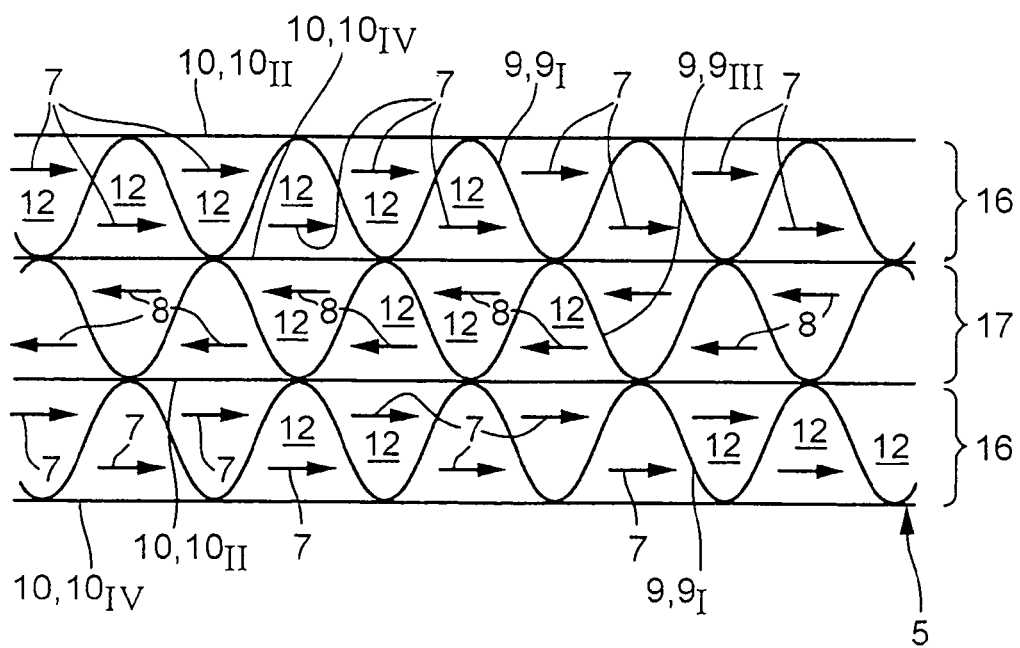
FIG. 3 shows a view corresponding to section lines III in FIG. 1 of an excerpt from the device shown in FIG. 2.

In accordance with FIG. 3, the layered arrangement of the folded or corrugated first plate material 9 and of the flat or smooth second plate material 10 is made so as to be concentric and annular or helical with respect to the longitudinal center line 6. As a result, the channels 12 form first annuli or coils 16 and second annuli or coils 17, which are indicated by curly brackets in FIG. 3.

In the first annuli or coils 16, the associated channels 12 are inclined in the first direction 13 in the circumferential direction with respect to the longitudinal center line 6. The inclination and orientation of the channels 12 of the first annuli or coils 16 is in this case selected in such a way that when medium flows through them the annular swirl flow 7 rotating in the first direction 13 results for each first annulus 16 or for each first coil 16, as symbolized by corresponding arrows in FIG. 3.

By contrast, the channels 12 in the second annuli or coils 17 are inclined in the second direction 15 in the circumferential direction with respect to the longitudinal center line 6. Accordingly, the channels 12 of the second annuli or coils 17, when medium flows through them, generate the annular swirl flow 8 which rotates in the second direction 15 for each second annulus 17 or for each second coil 17, which is once again symbolized by corresponding arrows in FIG. 3.

In this context, it is important that according to FIG. 3 the first annuli or coils 16 and the second annuli or coils 17 alternate in the radial direction with respect to the longitudinal center line 6. In this way, the swirl generating structure 5, when medium flows through it, generates a multiplicity of annular swirl flows 7, 8, i.e. annulus swirl flows 7, 8, which, as seen in the radial direction, alternately rotate in the first direction 13 and the second direction 15.

A complex flow system of this type made up of concentric, opposite annulus swirl flows 7, 8 has a correspondingly large number of tangential shearing layers, which are in each case formed between mutually adjacent flows with different flow velocities and/or flow directions. The adjacent flows are intimately mixed in shearing layers of this type, and consequently a large number of shearing layers is associated with a correspondingly intensive flow mixing. The result of this is that in the flow mixing according to the invention the fluid flows 2, 3 which have been supplied to the device 4 are intensively mixed after only a relatively short mixing section.

To impart as homogeneous an axial orientation as possible to the mixed flow, in an advantageous refinement it is possible for at least one or preferably a plurality of annular, as far as possible swirl-free axial flows, which are likewise arranged concentrically with respect to the longitudinal center line 6, to be formed in addition to the swirl flows 7, 8 which rotate in opposite directions. In this case, the axial flows are each arranged radially between two adjacent swirl flows 7, 8 rotating in opposite directions. These axial flows are represented by rectilinear, dotted arrows 18 in FIG. 1.

Figure 4:
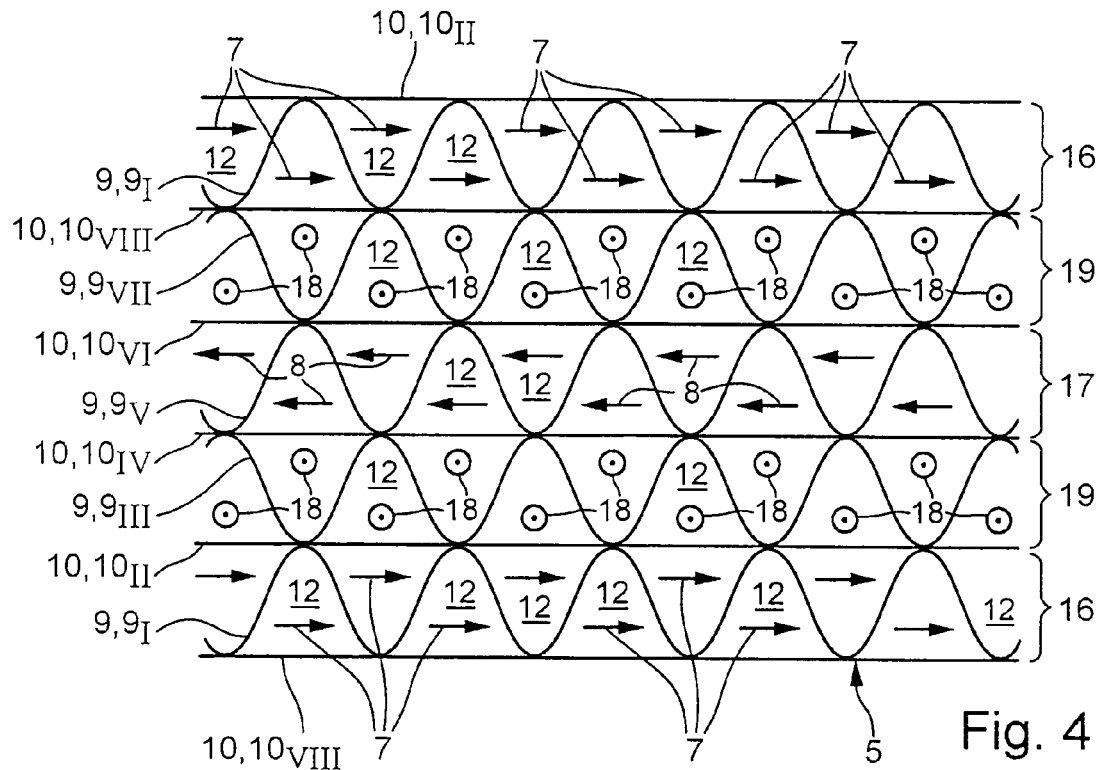
FIG. 4 shows a similar view to that shown in FIG. 3, but for a different embodiment.

FIG. 4 shows an excerpt from the swirl generating structure 5, with the aid of which, as medium flows through it, the axial flows 18 are generated as well as the swirl flows 7, 8. For this purpose, a third annulus 19 or a third coil 19 is arranged in each case between a first annulus 16 or a first coil 16 and a second annulus 17 or a second coil 17. For the third annuli or coils 19, the corrugated or folded first plate material 9 which is in each case used is oriented in such a way that its folds or corrugations 11 or the channels 12 which they form run parallel to the longitudinal center line 6 of the swirl generating structure 5. As medium flows through them, the third annuli or coils 19 generate an annular axial flow 18 for each third annulus 19 or for each coil 19, symbolized by arrow tips designated 18 in FIG. 4.

A tangential shearing layer which contributes to intimate mixing is likewise formed between an annular axial flow 18 of this type and the respectively adjacent swirl flow 7 or 8. At the same time, the respective swirl flow 7 or 8 is diverted in axial direction. Therefore, the mixture flow can be axially oriented with the aid of these additional axial flows 18. An axial orientation of this nature may be advantageous for certain applications, for example if a fuel-oxidant mixture is to be introduced into a catalyst, a burner or a combustion chamber.

In accordance with FIG. 1, the device 4 may have a straightener structure 21, which axially orients the mixed flow which is supplied and flows through it, at the end of a mixing zone 20 downstream of the swirl generating structure 5.

Figure 5:
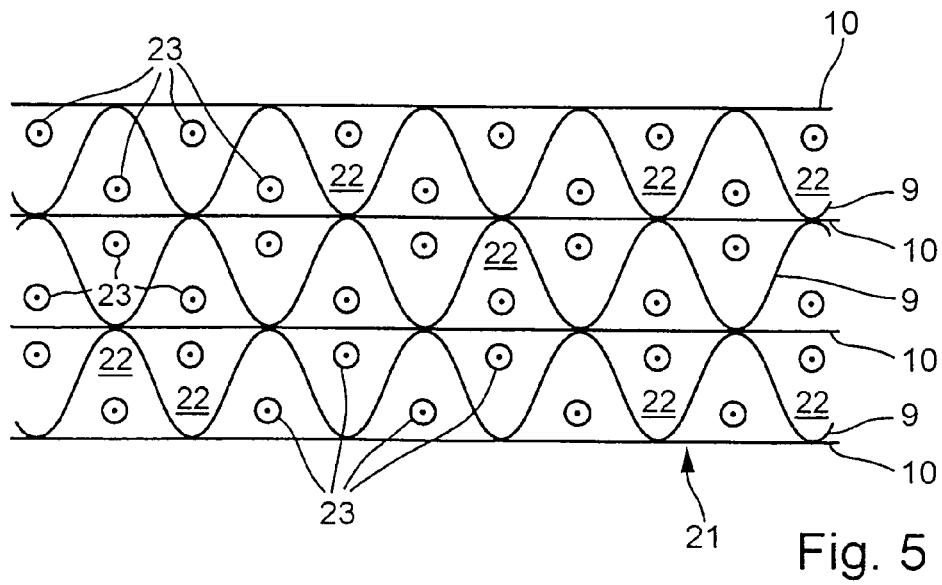
FIG. 5 shows a view corresponding to section lines V in FIG. 1 of an excerpt from a straightener structure.

In accordance with FIG. 5, the straightener structure 21 may expediently comprise a multiplicity of channels 22 which run parallel to the longitudinal center line 6 and effect the desired axial orientation of the mixed flow passing through them. It is preferable for the straightener structure 21 also to be constructed from a layered arrangement of corrugated or folded first plate materials 9 and flat or smooth second plate materials 10. In this case too, the individual corrugations or folds 11 form the parallel channels 22. The axially oriented mixture flow is in each case denoted by 23 in FIGS. 1 and 5 and symbolized by arrows (FIG. 1) or by arrow tips (FIG. 5).

To obtain the lowest possible pressure drop during flow through the straightener structure 21, the channels 22 of the straightener structure 21 are relatively short, in particular shorter than the channels 12 of the swirl generating structure 5. Moreover, the channels 22 of the straightener structure 21 may have relatively large cross-sectional areas; in particular, their cross-sectional areas are larger than those of the channels 12 of the swirl generating structure 5.

It is expedient for the cross-sectional areas of the channels 12 to be relatively small, so that the swirl generating structure 5 at the same time forms an effective protection against flashback. By way of example, the channels 12 have a diameter of from 0.5 mm to 5 mm.

In a refinement, the function of a catalyst may be integrated in the swirl generating structure 5. This is expediently realized by some of the channels 12 being designed to be catalytically active, while the other channels 12 are catalytically inactive. Catalytically active channels 12 can be realized, for example, by catalytically active surfaces in the respective channels 12. In this context, a configuration in which catalytically active channels 12 and catalytically inactive channels 12 alternate would be expedient, so that the flow through the catalytically inactive channels 12 serves to cool the swirl generating structure 5.

The mixing of the separate fluid flows 2 and 3 supplied can also be improved by adjacent channels 12 of the swirl generating structure 5 being in communication with one another in a portion which is at a distance from the outlet end of the swirl generating structure 5. The communicating connection in this gas-permeable portion may be made possible, for example, by through openings, bores, porosity or gas-permeable plate materials 9, 10 or gas-permeable structures, such as grid or mesh structures. Moreover, this communicating connection may be arranged and/or configured in such a way that channels which are adjacent within the same annulus 16, 17, 19 or within the same coil 16, 17, 19 are in communication with one another. As an alternative or in addition, the communicating connection may be arranged and/or configured in such a way that channels 12 which adjoin one another in adjacent annuli or coils 16, 17, 19 are in communication with one another. What is important is that all the channels 12 be separate from one another and have medium flowing through them independently of one another at least at the outlet end of the swirl generating structure 5.

According to another refinement, it is possible for channels 12 which are arranged radially further inward to have a different magnitude of inclination with respect to the longitudinal center line 6 than channels 12 arranged radially further outward. It is preferable for the inclination of the channels 12 with respect to the longitudinal center line 6 to increase at increasing distance from the longitudinal center line 6.

The mixing according to the invention functions as follows, in accordance with FIG. 1:

The two separate fluid flows 2, 3 are fed to the swirl generating structure 5. During flow through the swirl generating structure 5, the abovementioned, opposite swirl flows 7, 8 are generated from the two fluid flows 2, 3, which swirl flows 7, 8 are arranged concentrically with respect to the longitudinal center line 6 and rotate into one another. Then, intensive mixing of the flow and in particular tangential widening of the flow are effected in the mixing zone 20.

Given a corresponding design, the swirl generating structure 5 may also produce annular axial flows 18 which are introduced concentrically into the flow system of the opposite swirl flows 7, 8.

In addition, the straightener structure 21 may be provided at the end of the mixing zone 20, so as to additionally axially orient the mixed flow as it flows through it. Ultimately, a more or less axially oriented flow 23 leaves the device 4.

In FIGS. 3, 4 and 5, the individual plates of the plate materials 9, 10 are illustrated as being flat, for the sake of simplicity. It will be clear that the individual plates of the plate materials 9, 10 are in each case curved about the longitudinal center line (not shown), specifically in accordance with their respective radial distance from the longitudinal center line 6.

The swirl generating structure 5 having the design shown in FIG. 3 can expediently be produced in the following way:

A first plate $9_I$ made from the corrugated or folded first plate material 9 is positioned in such a way that its corrugations or folds 11 are inclined in the first direction 13 with respect to a winding axis, which coincides with the subsequent longitudinal center line 6 of the swirl generating structure 5. Then, a second plate $10_{II}$ made from the smooth or flat second plate material 10 is placed onto this first plate $9_I$. Then, a third plate $9_{III}$ made from the first plate material 9 is placed onto the second plate $10_{II}$, in such a manner that its corrugations or folds 11 are inclined in the opposite, second direction 15 with respect to the winding axis (longitudinal center line 6). Then, a fourth plate $10_{IV}$, which again consists of the smooth or flat second plate material 10, can be placed onto the third plate $9_{III}$. Then, the layered arrangement of plates $9_I$, $10_{II}$, $9_{III}$, $10_{IV}$ formed in this way is wound helically around the winding axis (longitudinal center line 6). As a result of the winding, a first plate 9, in turn comes to bear on the fourth plate $10_{IV}$, so that the layer structure is repeated in the radial direction. It will be clear that the layered arrangement may, of course, also be started with a smooth or flat second plate material 10 rather than a corrugated or folded first plate material 9, in order to arrive at the swirl generating structure 5 after the winding operation.

Figure 6:
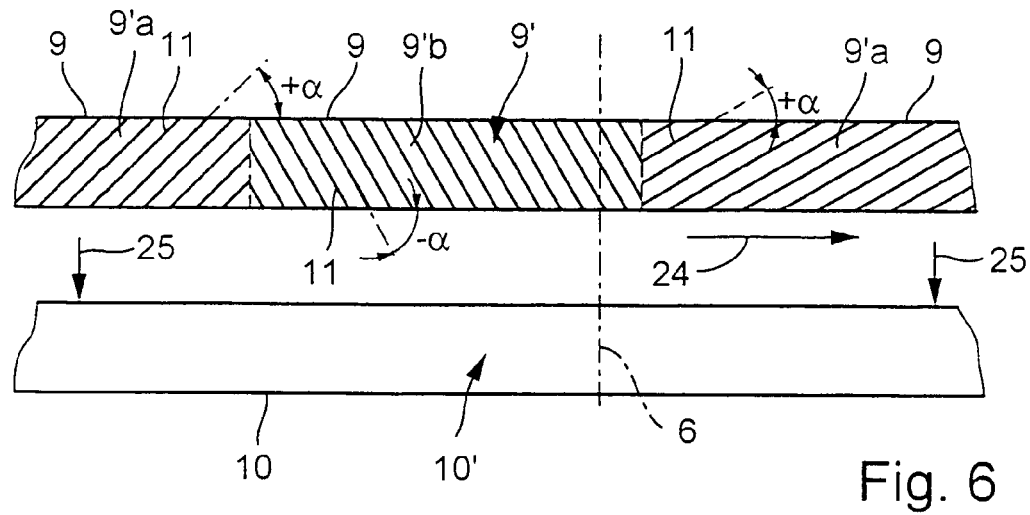
FIG. 6 shows a simplified view of plates for producing a swirl generating structure as shown in FIG. 3.

Alternatively, the swirl generating structure 5 having the design illustrated in FIG. 3 can also be produced in the following way:

In accordance with FIG. 6, a modified first plate 9, is produced, comprising a plurality of individual portions of the first plate material 9 arranged next to one another in a row, with the inclinations of the corrugations or folds 11 of successive portions 9'a, 9'b being oriented in opposite directions with respect to the winding axis 6. This modified first plate 9' is then placed, as indicated by arrows 25, onto a second plate 10' made from the planar second plate material 10 and is wound together with the latter around the winding axis or longitudinal center line 6. Depending on the length of the individual portions 9'a, 9'b with the same fold or corrugation inclination, this results in one or more helical windings (annuli or coils), in which the channels 12 have in each case substantially the same inclination. Since the portions 9'a, 9'b with corrugations or folds 11 oriented in the same direction alternate in a winding direction 24 symbolized by an arrow, the result of winding in the radial direction is a layered arrangement, in which oppositely oriented annuli or coils 16, 17 or oppositely oriented groups of annuli or coils 16, 17 alternate. With this procedure, only two plates 9', 10' which have been placed on top of one another have to be wound, which facilitates the winding operation, since the inclination of the corrugations or folds 11 with respect to the winding axis 6 in the case of the first plate material 9 or 9' impedes the winding operation. The more layers or strata of the corrugated or folded first plate material 9 have to be wound simultaneously, the more difficult the winding operation becomes.

The swirl generating structure 5 shown in FIG. 4 can, for example, be produced in the following way:

First of all, once again a first plate $9_I$ made from the corrugated or folded first plate material 9 is positioned in such a way that an inclination in the first direction 13 with respect to the winding axis 6 is produced for the associated channels 12. Then, a second plate $10_{II}$, which consists of the smooth or flat second plate material 10, is placed onto the first plate $9_I$.

Then, a third plate $9_{III}$ made from the first plate material 9 is placed onto the second plate $10_{II}$, with its folds or corrugations 11 oriented in such a way that the channels 12 that are formed as a result run parallel to the winding axis 6. Then, a fourth plate $10_{IV}$ made from the second plate material 10 is placed onto the third plate $9_{III}$. Then, a fifth plate $9_V$ once again made from the first plate material 9 is placed onto the fourth plate $10_{IV}$, with the orientation of the folds or corrugations 11 in this case being selected in such a way that the channels 12 which are formed as a result are inclined in the second direction 15 with respect to the winding axis 6. Then, a sixth plate $10_{VI}$, once again made from the second plate material 10, is placed onto the fifth plate $9_V$, and a seventh plate $9_{VII}$ made from the first plate material 9 is placed onto the sixth plate $10_{VI}$. The orientation of the folds or corrugations 11 of the seventh plate $9_{VII}$ are once again selected in such a way that the channels 12 which are formed as a result run parallel to the winding axis 6. Finally, an eighth plate $10_{VIII}$ made from the second plate material 10 is placed onto the seventh plate $9_{VII}$. Only then is the layer structure finished, so that the plates which have been layered on top of one another can be wound helically around the winding axis 6. The winding operation then in turn causes a first plate $9_I$ to come to bear on the eighth plate $10_{VIII}$. Here too, it will be clear that the first plate may in principle be formed from the second plate material 10 rather than from the first plate material 9, in order to achieve the desired design of the swirl generating structure 5.

Figure 7:
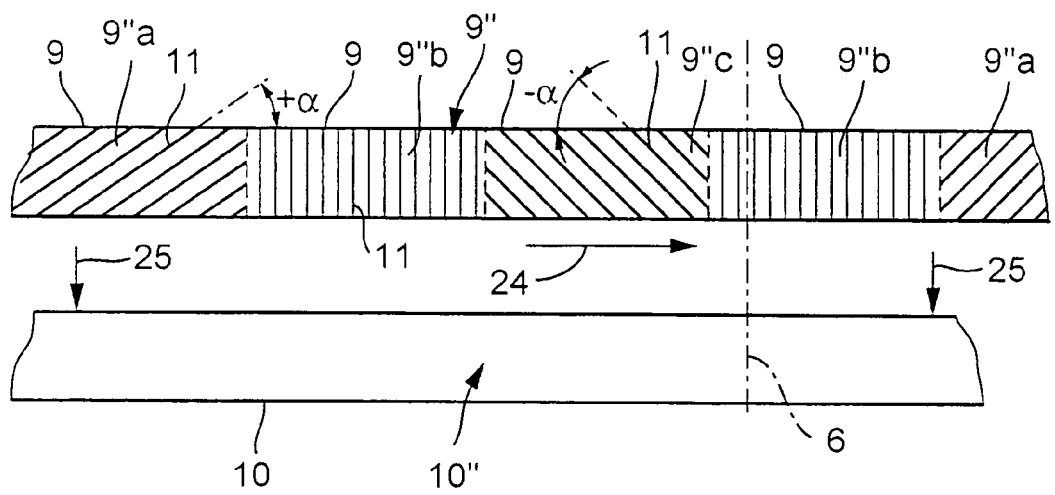
FIG. 7 shows a similar view to that shown in FIG. 6 but for the production of a swirl generating structure as shown in FIG. 4.

There is also an alternative procedure for the production of the swirl generating structure 5 shown in FIG. 4, and this alternative procedure will be explained briefly below with reference to FIG. 7.

First of all, in this case too a modified first plate 9" is produced from corrugated or folded first plate material 9, with the first plate 9" being assembled from a plurality of portions 9"a, 9"b, 9"c, which are placed against one another in the winding direction 24. The individual portions 9"a, 9"b, 9"c differ from one another by having a different orientation of their folds or corrugations 11 with respect to the winding axis 6. In the case of portions 9"a and 9"c, the corrugations or folds 11 are oriented such that they are inclined at between 0° and 90° with respect to the winding axis 6, whereas in the case of the angle portion 9"b arranged between them they are oriented substantially parallel to the winding axis 6. Furthermore, the corrugations or folds 11 of the two portions 9"a and 9"c are inclined in opposite directions to one another with respect to the winding axis 6.

This modified first plate 9" is then placed onto a second plate 10" made from the planar or smooth second plate material 10. Then, this assembly is wound around the winding axis 6. The dimensions of the individual portions 9"a, 9"b, 9"c of the modified first plate 9" in the winding direction 24 are such that the winding results in the radial direction in a structure in which first annuli or coils 16, third annuli or coils 19, second annuli or coils 17 and third annuli or coils 19 again alternate more or less regularly.

Figure 8:
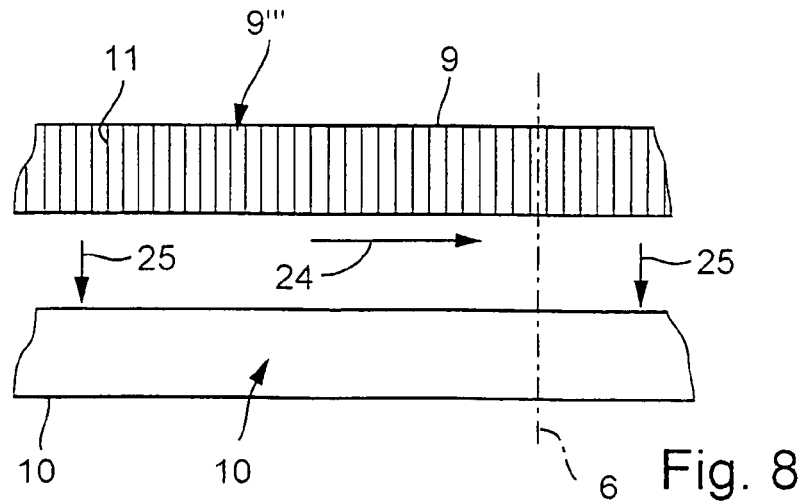
FIG. 8 shows a similar view to that shown in FIG. 6, but for the production of a straightener structure as shown in FIG. 5.

It is relatively simple to produce the straigtener structure 21 as shown in FIG. 5. For this purpose, in accordance with FIG. 8, a first plate 9''' made from corrugated or folded first plate material 9 is provided, with the folds or corrugations 11 oriented parallel to the winding axis 6. This first plate 9''' is placed onto a second plate 10''' made from smooth or planar second plate material 10 and together with the latter is wound up about the winding axis 6. This results in the structure shown in FIG. 5. It is also possible, prior to the winding operation, for a plurality of pairs of first plates 9''' made from first plate material 9 and second plates 10''' made from second plate material 10 to be layered on top of one another and then to be jointly wound around the winding axis 6.

LIST OF DESIGNATIONS

1 Portion of a channel
2 Fluid flow
3 Fluid flow
4 Device
5 Swirl generating structure
6 Longitudinal center line/winding axis
7 Swirl flow
8 Swirl flow
9 First plate material
10 Second plate material
11 Corrugation/fold
12 Channel
13 First direction
14 Axis
15 Second direction
16 First annulus/first coil
17 Second annulus/second coil
18 Axial flow
19 Third annulus/third coil
20 Mixing zone
21 Straigtener structure
22 Channel
23 Axially oriented flow
24 Winding direction
25 Arrow

The invention claimed is:

1. A device for mixing at least two separate fluid flows having a plurality of fluid flow channels arranged in a plurality of concentric rings with respect to a longitudinal center line,
the fluid flow channels forming first rings, in which the fluid flow channels are inclined in a first direction in the circumferential direction with respect to the longitudinal center line, in such a way that as medium flows through them, they in each case generate an annular swirl flow rotating in the first direction for each first ring,
the fluid flow channels forming second rings, in which the fluid flow channels are inclined in a second direction which is counter to the first direction, in the circumferential direction with respect to the longitudinal center line, in such a way that, as medium flows through them, they in each case generate an annular swirl flow rotating in the second direction for each second ring,
first groups, each comprising at least one first ring, and second groups, each comprising at least one second ring, alternating in the radial direction with respect to the longitudinal center line,
wherein the inclination of the channels with respect to the longitudinal center line increases at increasing distance from the longitudinal center line;
wherein the fluid flow channels form third rings, in which the fluid flow channels run parallel to the longitudinal center line,
third groups, each comprising at least one third ring, are in each case arranged radially between a first group and a second group.

2. The device as claimed in claim 1,
wherein the first and second rings or the first and second and third rings are arranged in a swirl generating structure,
a straightener structure, which exclusively includes fluid flow channels running parallel to the longitudinal center line, is arranged downstream of and at a distance from the swirl generating structure.

3. The device as claimed in claim 2, wherein the fluid flow channels of the straightener structure are shorter and have larger cross-sectional areas than the fluid flow channels of the swirl generating structure.

4. The device as claimed in claim 1, wherein some of the fluid flow channels have catalytically active surfaces, while the other fluid flow channels have catalytically inactive surfaces.

5. The device as claimed in claim 1, wherein radially adjacent fluid flow channels of the first and second rings or of the first and second and third rings are in communication with one another via at least one gas-permeable portion.

6. The device as claimed in claim 1, wherein
the device, radially with respect to the longitudinal center line, has a plurality of layers of a corrugated or folded first plate material, the corrugations or folds of which form the fluid flow channels,
in each case one intermediate layer of a flat or smooth second plate material is arranged radially between two adjacent layers,
the plate materials are layered concentrically and annularly or helically with respect to the longitudinal center line.

7. The device as claimed in claim 1, wherein adjacent fluid flow channels are in communication with one another, in such a manner that when medium flows through the fluid flow channels, the flow is intimately mixed by being transferred between fluid flow channels.

8. The device as claimed in claim 2, wherein the fluid flow channels of the straightener structure are shorter or have larger cross-sectional areas than the fluid flow channels of the swirl generating structure.

9. The device as claimed in claim 2, wherein the fluid flow channels have a diameter from 0.5 mm to 5 mm.

* * * * *